United States Patent
Jewell

[11] 3,914,224
[45] Oct. 21, 1975

[54] 1,3,5-S-TRIAZINES
[75] Inventor: Richard A. Jewell, Landenberg, Pa.
[73] Assignee: E. I. Du Pont de Nemours & Company, Wilmington, Del.
[22] Filed: Nov. 12, 1973
[21] Appl. No.: 414,877

[52] U.S. Cl. .............................. 260/248 NS; 71/93
[51] Int. Cl.² ..................................... C07D 251/26
[58] Field of Search ............................. 260/248 NS

[56] References Cited
UNITED STATES PATENTS
2,016,521   10/1935   Steindorff et al. ............... 260/248 X OTHER PUBLICATIONS
Hantzsch et al., Ber. Vol. 38, pp. 1005–1013, (1905).
Paoloni et al.; J. Het. Chem., Vol. 5, pp. 533–554, (1968).

Primary Examiner—John M. Ford

[57] ABSTRACT
The s-triazines of the formula:

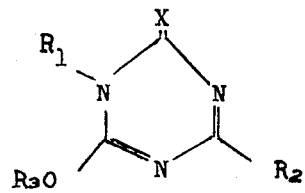

wherein
R$_2$ is XR$_4$,
R$_1$, R$_3$, and R$_4$ are certain organic radicals, and the X's are oxygen or sulfur are useful as herbicides and for the control of flowering and plant sexual reproduction. A preferred use of the compounds of the present invention is to prevent corn inbreeding by applying the triazine to the plant at or shortly before tassel emergence.

Exemplary of such compounds is: 1-(4-chlorophenyl)-4,6-dimethoxy-s-triazine-2(1H)-one.

7 Claims, No Drawings

1,3,5-S-TRIAZINES

BACKGROUND OF THE INVENTION

Co-pending U.S. Patent application Ser. No. 301,853 filed Oct. 30, 1972, by Julius J. Fuchs and Kang Lin, now U.S. Pat. No. 3,855,219, (which is a continuation-in-part of U.S. Patent application Ser. No. 268,767 filed July 3, 1972, now abandoned, which is in turn a continuation-in-part of U.S. Patent application Ser. No. 181,202 filed Sept. 16, 1971, now abandoned) discloses a class of 1,3,5-triazinediones of the general formula

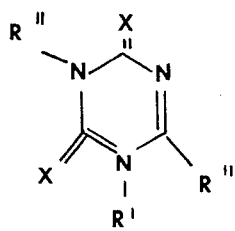

II where R' represents hydrogen or certain organic radicals, the R''s represent certain organic radicals, and the Xs represent oxygen or sulfur. These compounds are disclosed as being useful as selective herbicides.

Co-pending U.S. Patent application Ser. No. 301,852 filed Oct. 30, 1972, by David J. Fitzgerald and James D. Long disclosed the use of these compounds of Formula II as plant regulants in that they alter plant flowering and/or plant sexual reproduction.

Co-pending U.S. Patent application Ser. No. 348,322 filed Apr. 5, 1973, by Julius J. Fuchs and Kang Lin (which is a continuation-in-part of U.S. Patent application Ser. No. 325,358 filed Jan. 22, 1973) discloses a class of 1,3,5-triazinediones of the general formula

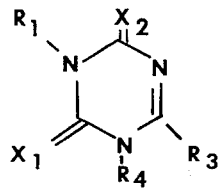

III wherein $R_3$ is $XR_4$; X, $X_1$ and $X_2$ are oxygen or sulfur; and $R_1$, $R_2$, and $R_4$ are certain organic radicals. These compounds are disclosed as being useful for the selective control of weeds in crops, for example, wheat and soybeans.

Co-pending U.S. Patent application Ser. No. 325,359 filed Jan. 22, 1973, by David J. Fitzgerald and James D. Long, now abandoned, discloses the use of these compounds of Formula III for altering plant flowering and sexual reproduction.

The present invention resulted from efforts to discover other novel, biologically active compounds.

SUMMARY OF THE INVENTION

This invention is a class of novel, biologically active triazines of the formula

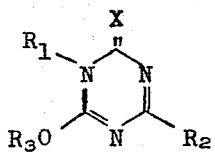

I wherein $R_1$ is n-propyl, a branched chain alkyl of 3 through 8 carbon atoms, cycloalkyl of 3 through 8 carbon atoms cycloalkylalkyl of 4 through 7 carbon atoms, alkenyl of 3 through 4 carbon atoms, alkynyl of 3 through 4 carbon atoms, benzyl or

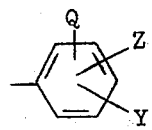

IV wherein

Y is hydrogen, halogen, alkyl of 1 through 4 carbon atoms, nitro, alkoxy of 1 through 4 carbon atoms, alkylthio of 1 through 4 carbon atoms, cyano, or trifluoromethyl;

Z is hydrogen, halogen, methyl, ethyl, nitro, methoxy, or methylthio; and

Q is hydrogen, halogen, or methyl;

$R_2$ is $SR_4$ or $OR_4$ where, when $R_1$ is phenyl or substituted phenyl, $R_4$ is methyl or ethyl, and when $R_1$ is other than phenyl or substituted phenyl, $R_4$ is alkyl of 1 through 6 carbon atoms, cycloalkyl of 3 through 6 carbon atoms, alkenyl of 3 through 4 carbon atoms, alkynyl of 3 through 4 carbon atoms, or benzyl;

$R_3$ is methyl or ethyl; and

X is oxygen or sulfur.

The invention also includes herbicidal compositions containing the above compounds as active ingredients, compositions for controlling flowering and plant sexual reproduction containing certain of the above compounds as active ingredients, methods of controlling undesirable vegetation by applying the compounds and/or herbicidal compositions, and methods of controlling flowering and plant sexual reproduction by applying certain of the compounds and/or the latter above-mentioned compositions.

PREFERRED COMPOUNDS

Certain of the compounds of Formula I above are preferred because of their ease of synthesis and higher herbicidal activity. These compounds include those where $R_1$ is n-propyl, a branched chain alkyl of 3 through 8 carbon atoms, cycloalkyl of 3 through 8 carbon atoms, cycloalkylalkyl of 4 through 7 carbon atoms, alkenyl of 3 through 4 carbon atoms, alkynyl of 3 through 4 carbon atoms, or benzyl. Most preferred because of their high herbicidal activity are those compounds where $R_1$ is isopropyl or cycloalkyl of 5 through 8 carbon atoms.

Certain of the compounds of Formula I above are preferred because of their ease of synthesis and their high activity with respect to their ability to control flowering and plant sexual reproduction. These compounds include those where $R_1$ is

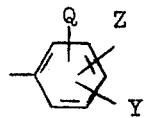

IV where Q, Y, and Z are as defined above. More preferred because of their higher activity are those compounds where Y is para halogen, Z is hydrogen or halogen, and Q is hydrogen. Most preferred is 1-(4-chlorophenyl)-4,6-dimethoxy-s-triazine-2(1H)-one.

A preferred embodiment of this invention is a method of preventing inbreeding of corn which comprises applying a triazine of Formula I to the corn before or at tassel emergence in an amount sufficient to prevent self-fertilization but insufficient to cause substantial foliar burn, chlorosis, or necrosis.

DETAILED DESCRIPTION OF THE INVENTION

Synthesis

The compounds of Formula I where X is oxygen can be prepared by the process illustrated in the following equations:

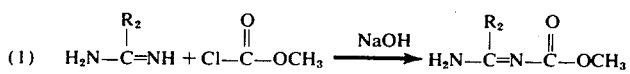

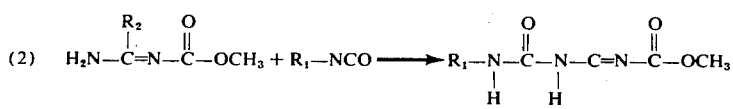

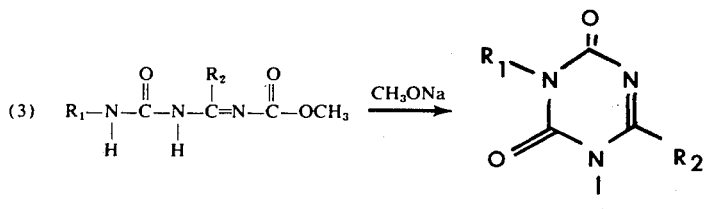

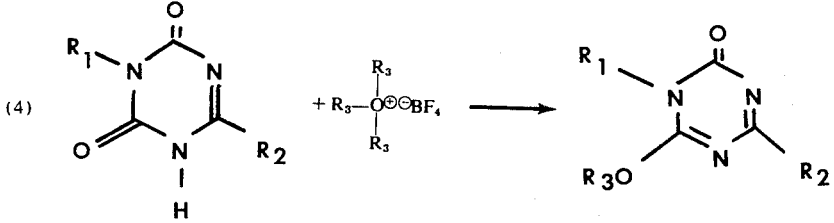

wherein $R_1$, $R_2$, and $R_3$ are as previously defined.

The synthesis of methyl N-(1-amino-1-alkoxymethylene)-carbamates from pseudoureas and methyl N-(1-amino-1-alkylthiomethylene)-carbamates from thiopseudoureas (equation 1) can be carried out by the reaction of the pseudourea (or thiopseudourea) with one equivalent of methyl chloroformate and one equivalent of sodium hydroxide in a water-methylene chloride solvent mixture at pH 9. After completion of the reaction the methylene chloride layer is dried and the solvent is evaporated to give the desired carbamate product.

The reaction product of equation 1 is reacted at 25° to 50°C. in a solvent, for example, methylene chloride, with an isocyanate for 5 to 24 hours (equation 2). The solvent is evaporated and the resulting N-methoxycarbonylallophanimidate (N-methoxycarbonylthioallophanimidate) can be purified by recrystallization from a suitable solvent.

The reaction product of equation 2 is then refluxed for 1 to 4 hours with one equivalent of sodium methoxide in methanol to effect cyclization (equation 3). The solvent is evaporated and the residue is dissolved in water. Acidification of the aqueous solution usually precipitates the 6-alkoxy-s-triazine-2,4(1H,3H)dione (or 6-alkylthio-s-triazine-2,4-(1H,3H)dione) as a substantially pure solid.

The s-triazinedione product of equation 3 is then reacted with trimethyloxonium tetrafluoroborate or triethyloxonium tetrafluoroborate in methylene chloride for 24 hours at 25° to 40°C. (equation 4). The mixture is shaken with an excess of 2 percent sodium carbonate solution and the methylene chloride layer is dried and evaporated. The residue is recrystallized from a suitable solvent, giving the desired s-triazine-2(1H)-one.

The compounds of Formula I where $R_1$ is phenyl or substituted phenyl can be prepared by the process illustrated by the following equations 5 and 6:

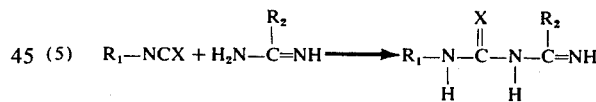

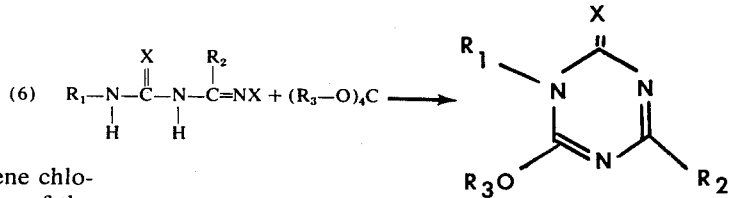

wherein $R_1$, $R_2$, $R_3$, and X are as previously defined.

The preparation of allophanimidates and 3-thioallophanimidates from pseudourea and the preparation of 1-thioallophanimidates and 1,3-dithioallophanimidates from thiopseudourea (equation 5) can be performed in a manner analogous to the procedure given in Organic Synthesis, 42, 87, which describes the preparation of methyl 4-phenyl-3-thioallophanimidate (i.e., 1-phenyl-2-thio-4-methyl isobiuret).

The reaction product of equation 5 is heated in an excess of tetramethylorthocarbonate or tetraethylorthocarbonate containing a catalytic quantity of an acid catalyst, for example, p-toluenesulfonic acid (equation 6). The excess solvent is slowly distilled off during a 2 to 8 hour period and the residue is recrystallized from a suitable solvent giving the desired 1-aryl-s-triazine-2-(1H)-one or 1-aryl-2thio-s-triazine-2-(1H)-one.

The compounds of Formula I where $R_1$ is other than phenyl or substituted phenyl and X is sulfur can be prepared by the process illustrated by the following equation.

(7) 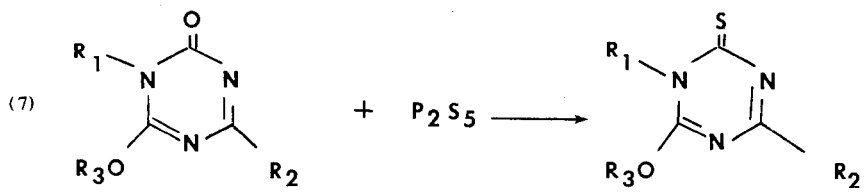

where $R_1$, $R_2$, and $R_3$ are as previously defined.

The reaction product of equation 4 is heated in pyridine with 1/5 equivalent of phosphorous pentasulfide at 80° to 95°C. for 12 to 48 hours (equation 7). The solvent is evaporated under vacuum and the residue is extracted with boiling benzene. The benzene is evaporated under vacuum and the residue is recrystallized from a suitable solvent affording the desired 2-thio-s-triazine-2(1H)-one.

The following examples illustrate the processes described above, all parts are parts by weight.

EXAMPLE 1

Preparation of 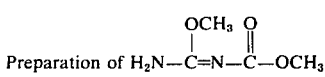

To a mixture of 30 parts of 2-methylpseudourea hydrogen sulfate, 80 parts of water, and 105 parts of methylene chloride maintained at 10° to 15°C. was added sufficient 50 percent sodium hydroxide solution to give a pH of 9.5. With the pH maintained at 9.5 by slow addition of sodium hydroxide solution, 18 parts of methyl chloroformate was added dropwise during a two-hour period with vigorous stirring. The reaction mixture was stirred at 25°C. for an additional three hours. The methylene chloride layer was then separated, dried over anhydrous sodium sulfate, and evaporated under vacuum. The resulting oil solidified upon trituration in hexane and the solid was collected by filtration, giving 20 parts of methyl N-(1-amino-1-methoxymethylene)carbamate, m.p. 35°–39°C.

EXAMPLE 2

Preparation of 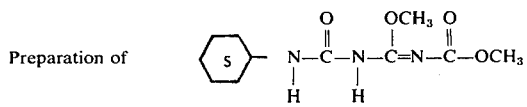

A mixture of 100 parts of methyl N-(1-amino-1-methoxymethylene)carbamate, 98 parts of cyclohexyl isocyanate, and 25 parts of methylene chloride was refluxed overnight. The solvent was evaporated under vacuum to give an oil which solidified upon standing overnight, thus affording 198 parts of crude methyl 4-cyclohexyl-N-methoxycarbonylallophanimidate, m.p. 65°–68°C.

EXAMPLE 3

Preparation of 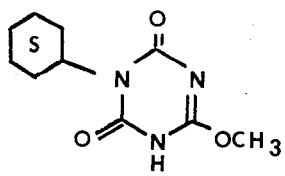

A mixture of 100 parts of methyl 4-cyclohexyl-N-methoxycarbonylallophanimidate, 21 parts of sodium methoxide, and 800 parts of methanol was refluxed for 2 hours. The solvent was evaporated under vacuum and the residue was dissolved in 600 parts of water. The aqueous solution was washed with methylene chloride and then acidified to pH 2 with hydrochloric acid. The precipitated solid was collected by filtration and washed with water, thus affording 77 parts of 3-cyclohexyl-6-methoxy-s-triazine-2,4(1H,3H)-dione, m.p. 195°–197°C.

EXAMPLE 4

Preparation of 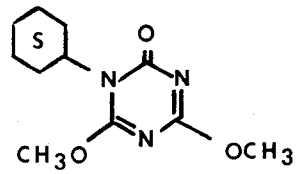

A mixture of 22 parts of 3-cyclohexyl-6-methoxy-s-triazine-2,4(1H,3H)-dione, 17 parts of trimethyloxonium tetrafluoroborate, and 25 parts of anhydrous methylene chloride was refluxed under a nitrogen atmosphere for 15 minutes and then stirred overnight at 25°C. An additional 25 parts of methylene chloride was added and the reaction mixture was shaken with 1,020 parts of a 2 percent sodium carbonate solution until all solids were dissolved. The methylene chloride layer was dried over anhydrous sodium sulfate and evaporated under vacuum to give a solid. Recrystallization from 1-chlorobutane afforded 6 parts of 1-cyclohexyl-4,6-dimethoxy-s-triazine-2(1H)-one (compound 1), m.p. 143°–145°C.

EXAMPLE 5

Preparation of 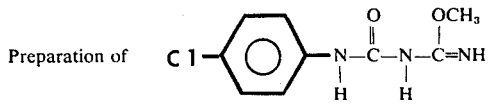

320 Parts of a 50 percent sodium hydroxide solution was added slowly to a mixture of 345 parts of 2-methylpseudourea hydrogen sulfate, 3,000 parts of water, and 4,000 parts of methylene chloride maintained at 10° to 15°C. With vigorous stirring there was then added 307 parts of 4-chlorophenyl isocyanate. The mixture was stirred vigorously for 6 hours at 25°C. and then the methylene chloride layer was separated, dried over anhydrous sodium sulfate, and evaporated to give an oil. Trituration in hexane solidified the oil, thus affording 356 parts of methyl 4-(p-chlorophenyl) allophanimidate, m.p. 114°–116°C.

EXAMPLE 6

Preparation of 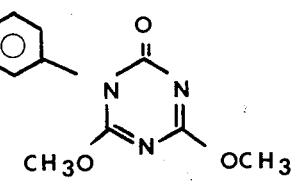

A mixture of 50 parts of methyl 4-(p-chlorophenyl) allophanimidate, 600 parts of tetramethylorthocarbonate, and 2 parts of p-toluenesulfonic acid was heated in a flask equipped with a Vigreaux distillation column. The reaction mixture was slowly distilled over a 5-hour period until 450 parts of distillate had been collected. The reaction flask was cooled in ice and the resulting solid was collected by filtration and washed with hexane, thus affording 26 parts of 1-(p-chlorophenyl)-4,6-dimethoxy-s-triazine-2(1H)-one (compound 2), m.p. 194°–196°C.

EXAMPLE 7

Preparation of 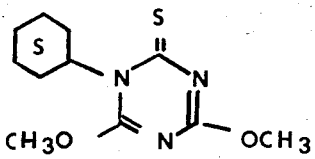

A mixture of 100 parts of 1-cyclohexyl-4,6-dimethoxy-s-triazine-2(1H)-one, 19 parts of purified phosphorous pentasulfide, and 500 parts of pyridine is heated at 85°C. for 48 hours. The solvent is evaporated under vacuum and the residue is extracted with boiling benzene. Concentration of the benzene extract gives 1-cyclohexyl- 4,6-dimethoxy-2-thio-s-triazine-2(1H)-one (compound 3).

EXAMPLE 8

The following s-triazinediones of Formula I can be prepared by the procedures of examples 1–7. The substituent $R_1$ is determined by the isocyanate used in example 2 or the aromatic isocyanate or isothiocyanate used in example 5. The substituent $R_2$ is determined by the pseudourea or thiopseudourea used in examples 1 or 5. The substituent $R_3$ is determined by the oxonium salt used in example 4 or by the orthocarbonate used in example 6. The 2-thio-s-triazineones can be prepared by using an aromatic isothiocyanate as in example 5 or as shown in example 7.

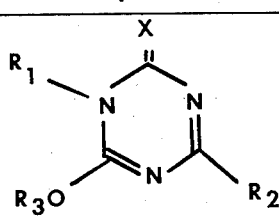

| Compound No. | $R_1$ | $R_2$ | $R_3$ | X |
|---|---|---|---|---|
| 4 | 2,4-Cl₂-C₆H₃— | —OCH₃ | —CH₃ | O |

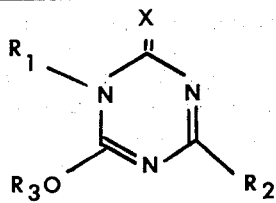

| Compound No. | $R_1$ | $R_2$ | $R_3$ | X |
|---|---|---|---|---|
| 5 | 2,6-Cl₂-C₆H₃— | —OCH₃ | —CH₃ | O |
| 6 | F₃C—C₆H₄— | —OCH₃ | —CH₃ | O |
| 7 | NC—C₆H₄— | —OCH₃ | —CH₃ | O |
| 8 | CH₃O—C₆H₄— | —OCH₃ | —CH₃ | O |
| 9 | 3,4-(CH₃O)₂-C₆H₃— | —OCH₃ | —CH₃ | O |
| 10 | O₂N—C₆H₄— | —OCH₃ | —CH₃ | O |
| 11 | 2,4-(O₂N)₂-C₆H₃— | —OCH₃ | —CH₃ | O |
| 12 | 2,6-Cl₂-C₆H₃— | —OCH₃ | —CH₃ | O |
| 13 | CH₃S—C₆H₄— | —OCH₃ | —CH₃ | O |
| 14 | 3,4-(CH₃S)₂-C₆H₃— | —OCH₃ | —CH₃ | O |
| 15 | CH₃—C₆H₄— | —OCH₃ | —CH₃ | O |
| 16 | 3,4-(CH₃)₂-C₆H₃— | —OCH₃ | —CH₃ | O |
| 17 | 2,4,6-(CH₃)₃-C₆H₂— | —OCH₃ | —CH₃ | O |
| 18 | C₆H₅— | —OCH₃ | —CH₃ | O |
| 19 | (CH₃)₃C—C₆H₄— | —OCH₃ | —CH₃ | O |
| 20 | n-butyl—O—C₆H₄— | —OCH₃ | —CH₃ | O |
| 21 | n-butyl—S—C₆H₄— | —OCH₃ | —CH₃ | O |
| 22 | 2,6-(C₂H₅)₂-C₆H₃— | —OCH₃ | —CH₃ | O |
| 23 | CH₃CH₂CH₂— | —OCH₃ | —CH₃ | O |
| 24 | (CH₃)₂CH— | —OCH₃ | —CH₃ | O |

-Continued $$\begin{array}{c} X \\ R_1 \\ \diagdown \\ N \\ | \\ R_3O \end{array} \begin{array}{c} \| \\ C \\ \diagup \\ N \\ \| \\ \end{array} \begin{array}{c} \\ N \\ \diagup \\ R_2 \end{array}$$

| Compound No. | R₁ | R₂ | R₃ | X |
|---|---|---|---|---|
| 25 | (CH₃CH₂)(CH₃)CH— | —OCH₃ | —CH₃ | O |
| 26 | CH₃(CH₂)₅(CH₃)CH— | —OCH₃ | —CH₃ | O |
| 27 | cyclopentyl-S | —OCH₃ | —CH₃ | O |
| 28 | cyclopropyl | —OCH₃ | —CH₃ | O |
| 29 | 7-membered ring (S) | —OCH₃ | —CH₃ | O |
| 30 | 6-membered ring (S) | —OCH₃ | —CH₃ | O |
| 31 | cyclopropyl-CH₂— | —OCH₃ | —CH₃ | O |
| 32 | (S-containing 6-ring)-CH₂— | —OCH₃ | —CH₃ | O |
| 33 | CH₂=CH—CH₂— | —OCH₃ | —CH₃ | O |
| 34 | CH₂=CH—CH(CH₃)— | —OCH₃ | —CH₃ | O |
| 35 | HC≡C—CH₂— | —OCH₃ | —CH₃ | O |
| 36 | HC≡C—CH(CH₃)— | —OCH₃ | —CH₃ | O |
| 37 | C₆H₅—CH₂— | —OCH₃ | —CH₃ | O |
| 38 | Cl—C₆H₄— | —SCH₃ | —CH₃ | O |
| 39 | C₆H₅(S) | —OCH₃ | —CH₃ | O |
| 40 | (CH₃)₂CH— | —OCH₃ | —CH₃ | O |
| 41 | Cl—C₆H₄— | —OCH₃ | —CH₂CH₃ | O |
| 42 | C₆H₅(S) | —OCH₃ | —CH₃ | O |
| 43 | (CH₃)₂CH— | —OCH₃ | —CH₃ | O |
| 44 | Cl—C₆H₄— | —OCH₃ | —CH₃ | S |
| 45 | (CH₃)₂CH— | —OCH₃ | —CH₃ | O |
| 46 | Cl—C₆H₄— | —OC₂H₅ | —CH₃ | O |
| 47 | Cl—C₆H₄— | —SC₂H₅ | —CH₃ | O |
| 48 | C₆H₅(S) | —OC₂H₅ | —CH₃ | O |
| 49 | C₆H₅(S) | —SC₂H₅ | —CH₃ | O |
| 50 | (CH₃)₂CH— | —S(CH₂)₅CH₃ | —CH₃ | O |
| 51 | C₆H₅(S) | —O—cyclopropyl | —CH₃ | O |
| 52 | (CH₃)₂CH— | —S—C₆H₅(S) | —CH₃ | O |
| 53 | C₆H₅(S) | —SCH₂CH=CH₂ | —CH₃ | O |
| 54 | C₆H₅(S) | —S—CH(CH₃)CH=CH₂ | —CH₃ | O |
| 55 | C₆H₅(S) | —S—CH≡CH | —CH₃ | O |
| 56 | C₆H₅(S) | —S—C(CH₃)HC≡CH | —CH₃ | O |
| 57 | (CH₃)₂CH— | —SCH₂—C₆H₅ | —CH₃ | O |
| 58 | F—C₆H₄— | —OCH₃ | —CH₃ | O |
| 59 | Br—C₆H₄— | —OCH₃ | —CH₃ | O |
| 60 | I—C₆H₄— | —OCH₃ | —CH₃ | O | m.p. 155–157°

FORMULATIONS OF THE COMPOUNDS

The formulations of the compounds of Formula I for use in this invention can be prepared in conventional ways. They include dusts, granules, pellets, solutions, suspensions, emulsions, wettable powders, emulsifiable concentrates, and the like. Many of these can be applied directly. Sprayable formulations can be extended in suitable media and used at spray volumes of from a few pints to several hundred gallons per acre. High strength compositions are primarily used as intermediates for further formulation. The formulations, broadly, contain about 1 percent to 99 percent by weight of active ingredient(s) and at least one of (a) about 0.1 percent to 20 percent surfactant(s) and (b) about 5 percent to 99 percent solid or liquid diluent(s). More specifically, they will contain these ingredients in the following approximate proportions.

| | Active Ingredient | Diluent(s) | Surfactant(s) |
|---|---|---|---|
| Wettable Powders | 20–90 | 0–74 | 1–10 |
| Oil Suspensions Emulsions, Solutions (Including Emulsifiable Concentrates) | 5–50 | 40–95 | 0–15 |
| Aqueous Suspensions | 10–50 | 40–84 | 1–20 |
| Dusts | 1–25 | 70–99 | 0–5 |
| Granules and Pellets | 1–95 | 5–99 | 0–15 |
| High Strength Compositions | 90–99 | 0–10 | 0–2 |

Lower or high levels of active ingredient can, of course, be present depending on the intended use and the physical properties of the compound. Higher ratios of surfactant to active ingredient are sometimes desirable and are achieved by incorporation into the formulation or by tank mixing.

Typical solid diluents are described in Watkins et al. "Handbook of Insecticide Dust Diluents and Carriers," 2nd Edition, Dorland Books, Caldwell, New Jersey. The more absorptive diluents are preferred for wettable powders and the denser ones for dusts. Typical liquid diluents and solvents are described in Marsden "Solvents Guide," 2nd Edition, Interscience, New York, 1950. Solubility under 0.1 percent is preferred for suspension concentrates; solution concentrates are preferably stable against phase separation at 0°C. "McCutcheon's Detergents and Emulsifiers Annual" Allured Publishing Corporation, Ridgewood, New Jersey, as well as Sisely and Wood "Encyclopedia of Surface-Active Agents," Chemical Publishing Co., New York, 1964, lists surfactants and recommended uses. All formulations can contain minor amounts of additives to reduce foam, caking, corrosion, microbiological growth, etc.. Preferably, ingredients should be approved by the U.S. Environmental Protection Agency for the use intended.

The methods of making such compositions are well known. Solutions are prepared by simply mixing the ingredients. Fine solid compositions are made by blending and usually grinding as in a hammer or fluid energy mill. Suspensions are prepared by wet milling (see, for example, Littler U.S. Pat. No. 3,060,084). Granules and pellets can be made by spraying the active material upon preformed granule carriers or by agglomeration techniques (see J. E. Browning "Agglomeration," *Chemical Engineering*, Dec. 4, 1967, pages 147 ff. and "Perry's Chemical Engineer's Handbook," 4th Edition, McGraw-Hill, New York, 1963, pages 8–59 ff.

For further information regarding the art of formulation see, for example:

H. M. Loux, U.S. Pat. No. 3,235,381, Feb. 15, 1966 Column 6, line 16 through column 7, line 19, and examples 10–41.

R. W. Luckenbaugh, U.S. Pat. No. 3,309,192, Mar. 14, 1967, Column 5, line 43 through column 7, line 62, and examples 8, 12, 15, 39, 41, 52, 53, 58, 132, 138–140, 162–164, 166, 167, and 169–182.

H. Gysin and E. Knusli, U.S. Pat. No. 2,891,855, June 23, 1959, Column 3, line 66 through column 5, line 17 and examples 1 through 4.

G. C. Klingman, "Weed Control as a Science," John Wiley & Sons, Inc., New York, 1961, pages 81 through 96.

J. D. Fryer and S. A. Evans, "Weed Control Handbook," 5th Edition, Blackwell Scientific Publications, Oxford, 1968, pages 101–103.

Typical formulations are shown in the following examples. All percentages are by weight.

EXAMPLE A

Wettable powder

| | |
|---|---|
| 1-(4-chlorophenyl)-4,6-dimethoxy-s-triazine-2(1H)-one | 40% |
| dioctyl sodium sulfosuccinate | 1.5% |
| sodium ligninsulfonate | 3% |
| low viscosity methyl cellulose | 1.5% |
| attapulgite | 54% |

The ingredients are thoroughly blended, passed through an air mill, to produce an average particle size under 15 microns, reblended, and sifted through a U.S.S. No. 50 sieve (0.3 mm opening) before packaging.

All compounds of the invention may be formulated in the same manner.

Example B
High Strength Concentrate

| | |
|---|---|
| 1-cyclohexyl-4,6-dimethoxy-s-triazine-2(1H)-one | 98.5% |
| silica aerogel | 0.5% |
| synthetic amorphous fine silica | 1.0% |

The ingredients are blended and ground in a hammer to produce a high strength concentrate essentially all passing a U.S.S. No. 50 sieve (0.3 mm openings). This material may then be formulated in a variety of ways.

Example C
Dust

| | |
|---|---|
| high strength concentrate, Example B | 10.2% |
| pyrophyllite, powdered | 89.8% |

The ingredients are thoroughly blended and packaged for use.

Example D
Aqueous Suspension

| | |
|---|---|
| 1-cyclohexyl-4,6-dimethoxy-s-triazine-2(1H)-one | 25% |
| hydrated attapulgite | 3% |
| crude calcium ligninsulfonate | 10% |
| sodium dihydrogen phosphate | 0.5% |
| water | 61.5% |

The ingredients are ground together in a sand mill until the solid particles have been reduced to diameters under 10 microns.

Example E
Granule

| | |
|---|---|
| wettable powder of Example A | 10% |
| attapulgite granules (U.S.S. No. 20–40; 0.84–0.42 mm | 90% |

A slurry of wettable powder containing 50 percent solids is sprayed on the surface of attapulgite granules in a double-cone blender. The granules are dried and packaged. They contain 4 percent active ingredient.

Example F
Oil Suspension

| | |
|---|---|
| 1-(2,4-dichlorophenyl)-4,6-dimethoxy-s-triazine-2(1H)-one | 25% |
| polyoxyethylene sorbitol hexaoleate | 5% |
| high aliphatic hydrocarbon oil | 70% |

The ingredients are ground together in a sand mill until the solid particles have been reduced to under about 5 microns. The resulting thick suspension may be applied directly, but preferably after being extended with oils or emulsified in water.

Example G

| Solution | |
|---|---|
| 1-cyclohexyl-4,6-dimethoxy-2-thio-s-triazine-2(1H)-one | 20% |
| dimethylformamide | 80% |

The ingredients are combined and stirred to produce a solution, which can be used for low volume applications.

USE OF THE INVENTION

The compounds of this invention are useful as herbicides in the control of undesirable vegetation. The compounds can be applied both pre-emergence and post-emergence. Application rates range from ½ to 10 kilograms per hectare. Method and rate of application depend on such factors as soil type, climatic conditions, and weed population. Uniform distribution of the compounds is important, particularly in post-emergence treatment.

These compounds may also be combined with other herbicides such as linuron, monuron, diuron, terbacil, and paraquat to control a broader spectrum of weeds.

The herbicidal activity of compounds of this invention were discovered in the greenhouse test. In this test seeds of crabgrass (*Digitaria* spp.), barnyardgrass (*Echinochloa cruagalli*), wild oats (*Avena fatua*), Cassia tora, morningglory (*Iponoea* spp.), cocklebur (*Xanthium* spp.), sorghum, corn, soybean, rice, wheat, and nutsedge tubers were planted in a growth medium and treated pre-emergence with the chemical dissolved in a non-phytotoxic solvent. At the same time cotton having five leaves (including cotyledonary ones), bushbeans with the third trifoliate leaf expanding, crabgrass with two leaves, barnyardgrass with two leaves, wild oats with one leaf, cassia with three leaves (including cotyledonary ones), morningglory with four leaves (including the cotyledonary ones), cocklebur with four leaves (including the cotyledonary ones), sorghum with three leaves, corn with three leaves, soybeans with two cotyledonary leaves, rice with two leaves, wheat with one leaf, and nutsedge with 3–5 leaves were sprayed. Treated plants and control were maintained in a greenhouse for 16 days, then all species were compared to control and visually rated for response to treatment. A qualitative (type of plant response) rating was made. The letter "C" indicates chlorosis; the letter "G" indicates growth retardation; the letter "H" indicates hormonal symptoms; the letter "S" indicates albinism. A quantitative rating on a scale of 0–10 was also made; a rating of 0 means no effect; a rating of 10 means maximum effect, for example, complete kill in the case of chlorosis. Results obtained in this test for one of the compounds of this invention are given in the following table.

| Rate, Kg/Ha | Compound 1-(2,4-dichlorophenyl)-4,6-dimethoxy s-triazine-2(1H)-one 2.0 | |
|---|---|---|
| Post Emergence | | |
| Bush Bean | 2C | 7G |
| Cotton | 2H | 6C |
| Morningglory | 6C | |
| Cocklebur | 2C | |
| Cassia | 3C | |
| Nutsedge | 2C | |
| Crabgrass | 2C | 7H |
| Barnyardgrass | 1C | |
| Wild Oats | 2C | |
| Wheat | 2C | |
| Corn | 1C | |
| Soybean | 4S | 6H |
| Rice | 4C | |
| Sorghum | 6C | |
| Pre-Emergence | | |
| Morningglory | 8C | |
| Cocklebur | 3C | |
| Cassia | 10C | |
| Nutsedge | 4S | |
| Crabgrass | 10S | |
| Barnyardgrass | 9S | |
| Wild Oats | 8S | |
| Wheat | 8S | |
| Corn | 2C | 6G |
| Soybean | 2C | 6H |
| Rice | 1S | |
| Sorghum | 9C | |

This invention can also be used to facilitate the production of many hybrid crops; for example, in the production of hybrid corn it can be used to prevent inbreeding. An s-triazine of Formula I is applied to the corn plant to be used as the female parent, preferably in a spray or granular formulation shortly before or at tassel emergence. This treatment substantially prevents pollen shed and may also destroy pollen viability, thus making it unnecessary to detassel. Adjacent, untreated male parent plants provide pollen to produce the hybrid. The invention can be used in a similar manner to prevent inbreeding of other crop plants, for example, wheat, rice, and soybeans, by treating the plants at or near flowering with an s-triazine of formula I. The invention can also be used to alter the fruit set pattern of various crops such as cotton, tomatos, citrus fruit, peaches, and apples. In these crops it is often desirable to prevent a late fruit set or development in order to facilitate mechanical harvesting and eliminate the necessity of thinning. This can be accomplished by applying an s-triazine of Formula I to the plant after the desired amount of fruit set has taken place.

Similarly, the invention can be used to eliminate fruit set altogether on certain types of ornamentals, for example, locusts and mimosa trees where the fruit may be considered undesirable.

This invention can be used to prevent seed development in hay crops such as alfalfa. This is considered desirable because the energy the plant would otherwise use to develop seeds can be used to increase forage development. Here again, the time to treat the plant is at or near flowering.

Another use for this invention is to prevent asparagus seed development. Asparagus plants are male or female. Female plants are about 20 percent less productive than male plants because of the energy utilized in seed development. By spraying the male plants at or just before flowering with the formulation of an s-triazine of Formula I. Fertilization and seed development can be substantially reduced or prevented, thus increasing yield of the female plants. Prevention of asparagus seed development is also desirable because otherwise the seeds are dropped, germinate, and the seedlings become a weed problem for the mature plants.

Presently, in new strawberry plantings, the flowers are pinched off during the first year in order to prevent fruit set. Fruit hinders development of the strawberry plant bed. By use of this invention, that is, by applying an s-triazine to the plants at or near flowering, the need for hand pinching the flower buds can be eliminated.

Another use of the invention is to prevent fruit set for seed development in certain crops which are not harvested for fruit or seed. For example, by applying one of the s-triazines of Formula I to potato plants at or near flowering, fruit and seed development which interfere with tuber development can be prevented.

Still another use for the invention is to control pollen development and/or release in certain noxious weeds, for example, ragweed.

In this invention the s-triazine of Formula I is applied to the plant in an amount which is sufficient to produce the desired change in flowering and/or sexual reproduction but which is insufficient to cause substantial foliar burn, chlorosis, or necrosis. The s-triazines vary in degree of phytotoxicity, and the phytotoxicity of a given s-triazine varies with the plant species. Thus, it is not possible to state a range of application rates which will be applicable for all s-triazines and all plant species. In general, rates in the range of about 0.1 to 10 kilograms per hectare will be used. The permissible rates for any combination of s-triazine and plant species can be readily established empirically. The capability of 1-(4-chlorophenyl)-4,6-dimethoxy-s-triazine-2(1H)-one and related compounds of Formula I to affect flowering and sexual reproduction of plants shown in the following test:

Foliar sprays of 1-(4-chlorophenyl)-4,6-dimethoxy-s-triazine-2-(1H)-one on Tenderette bush snap beans in the bud stage prevented fruit set four weeks with little effect on vegetative growth. Plants were about 23 days old and 25 to 30 centimeters tall when sprayed. Plants were passed under a fixed flat spray nozzle calibrated to deliver 230 liters per hectare. Data from this greenhouse test is summarized below:

TABLE I

| Compound | Rate kg/ha | Response Rating[1] 1 week | 3 week | Average Yield Per Plant at 4 Weeks[2] No. of Fruit | wt. of Fruit(g) |
|---|---|---|---|---|---|
| 1-(4-chlorophenyl)- | 1.1 | 2H,2G,DF | RF | 0 | 0 |
| 4,6-dimethoxy-s- | 0.27 | DF | RF | 0 | 0 |
| triazine-2(1H)-one | 0.07 | 0 | 0 | 13 | 52 |
| control | 0.00 | 0 | 0 | 18 | 73 |

[1] H = Hormonal effect
G = Growth retarded
DF = Delayed flowering
RF = Fruting reduced
0 = no effect
10 = maximum response
[2] average of 4 replications

What is claimed is:
1. A compound of the formula:

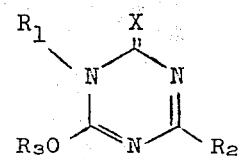

wherein
$R_1$ is n-propyl, a branched chain alkyl of 3 through 8 carbon atoms, cycloalkyl of 3 through 8 carbon atoms, cycloalkylalkyl of 4 through 7 carbon atoms, alkenyl of 3 through 4 carbon atoms, alkynyl of 3 through 4 carbon atoms, benzyl or

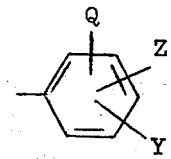

wherein
Y is hydrogen, halogen, alkyl of 1 through 4 carbon atoms, nitro, alkoxy of 1 through 4 carbon atoms, alkylthio of 1 through 4 carbon atoms, cyano or trifluoromethyl
Z is hydrogen, halogen, methyl, ethyl, nitro, methoxy, or methylthio; and
Q is hydrogen, halogen, or methyl;
$R_2$ is $SR_4$ or $OR_4$ where, when $R_1$ is phenyl or substituted phenyl, $R_4$ is methyl or ethyl; and when $R_1$ is other than phenyl or substituted phenyl, $R_4$ is alkyl of 1 through 6 carbon atoms, cycloalkyl of 3 through 6 carbon atoms, alkenyl of 3 through 4 carbon atoms, alkynyl of 3 through 4 carbon atoms, or benzyl;
$R_3$ is methyl or ethyl; and
X is oxygen or sulfur.
2. A compound of claim 1 wherein
$R_1$ is n-propyl, a branched chain alkyl of 3 through 8 carbon atoms, cycloalkyl of 3 through 8 carbon atoms, cycloalkylalkyl of 4 through 7 carbon atoms, alkenyl of 3 through 4 carbon atoms, alkynyl of 3 through 4 carbon atoms or benzyl.
3. A compound of claim 1 where $R_1$ is

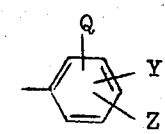

wherein
Y is hydrogen, halogen, alkyl of 1 through 4 carbon atoms, nitro, alkoxy of 1 through 4 carbon atoms, alkylthio of 1 through 4 carbon atoms, cyano, or trifluoromethyl;
Z is hydrogen, halogen, methyl, ethyl, nitro, methoxy, or methylthio; and
Q is hydrogen, halogen, or methyl.
4. A compound of claim 2 wherein
R$_1$ is isopropyl or cycloalkyl of 5 through 8 carbon atoms.
5. A compound of claim 3 wherein
Y is para halogen,
Z is hydrogen or halogen, and
Q is hydrogen.
6. The compound of claim 5 which is 1-(4-chlorophenyl)-4,6-dimethoxy-s-triazine-2(1H)-one.
7. The compound of claim 5 which is 1-(2,4-dichlorophenyl)-4,6-dimethoxy-s-triazine-2(1H)-one.

* * * * *